(12) United States Patent
Kolena et al.

(10) Patent No.: US 7,588,282 B2
(45) Date of Patent: Sep. 15, 2009

(54) AUTOMOTIVE VEHICLE SEAT SYSTEM AND METHOD OF FOLDING AND TUMBLING SAME

(75) Inventors: David Kolena, Bloomfield Hills, MI (US); Daniel Kirk, Taylor, MI (US); Artur W. Dlugosz, Sterling Heights, MI (US); Brian D. Phillips, Almont, MI (US)

(73) Assignee: Lear Corporation, Southfield, MI (US)

( * ) Notice: Subject to any disclaimer, the term of this patent is extended or adjusted under 35 U.S.C. 154(b) by 75 days.

(21) Appl. No.: 11/930,643

(22) Filed: Oct. 31, 2007

(65) Prior Publication Data

US 2009/0108616 A1    Apr. 30, 2009

(51) Int. Cl.
*B60N 2/36* (2006.01)
(52) U.S. Cl. .................. 296/65.09; 297/336; 297/344.1
(58) Field of Classification Search .............. 296/65.09; 297/336, 344.1
See application file for complete search history.

(56) References Cited

U.S. PATENT DOCUMENTS

| 5,482,349 | A | 1/1996 | Richter et al. |
| 5,570,931 | A | 11/1996 | Kargilis et al. |
| 6,817,670 | B2 | 11/2004 | Macey |
| 7,077,463 | B2 | 7/2006 | Sun et al. |
| 7,100,984 | B2 | 9/2006 | Epaud et al. |
| 7,121,624 | B2 * | 10/2006 | Pejathaya et al. ...... 297/378.12 |
| 7,137,666 | B2 | 11/2006 | Haladuda et al. |
| 2005/0057081 | A1 | 3/2005 | Kahn et al. |

* cited by examiner

*Primary Examiner*—Joseph D Pape
(74) *Attorney, Agent, or Firm*—Brooks Kushman P.C.

(57) ABSTRACT

An automotive vehicle seat includes a seat back and a seat bottom. The seat back and seat bottom are carried by bracketry. The seat back is foldable relative to the seat bottom. As the seat back folds toward the seat bottom, the seat bottom moves away from a rear of the bracketry. Once folded, the seat back, seat bottom and bracketry may tumble toward a front of a vehicle.

12 Claims, 4 Drawing Sheets

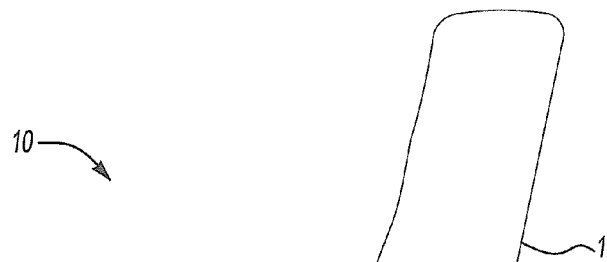
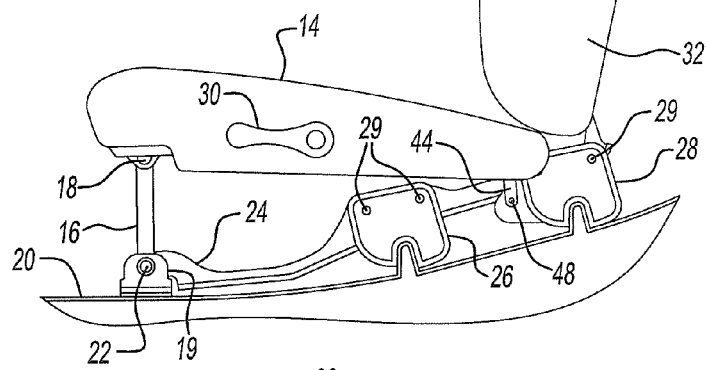
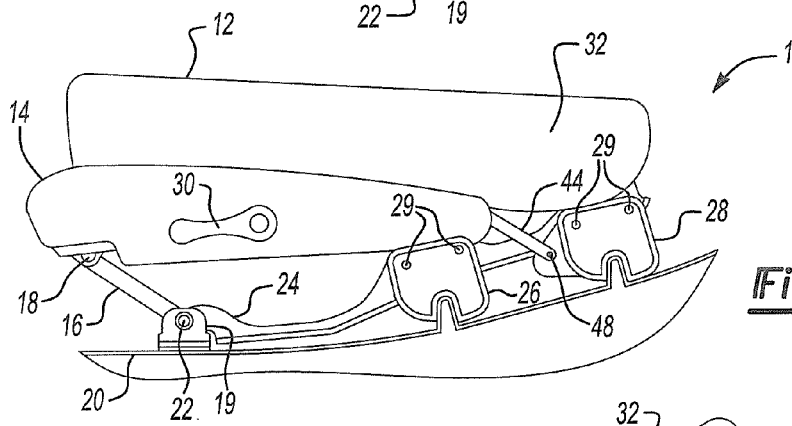
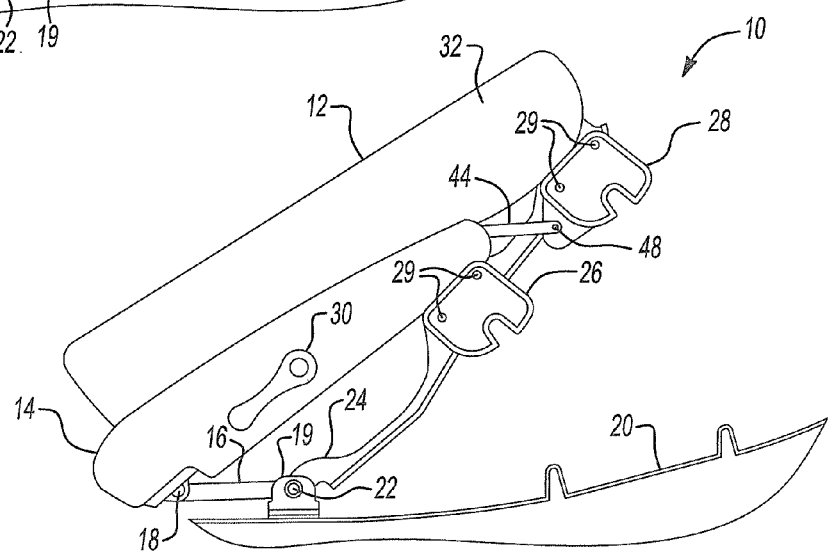

AUTOMOTIVE VEHICLE SEAT SYSTEM AND METHOD OF FOLDING AND TUMBLING SAME

BACKGROUND OF THE INVENTION

1. Field of the Invention

The invention relates to automotive vehicle seat systems and methods of folding and tumbling the same.

2. Background Art

Certain automotive vehicles, such as multi-purpose vehicles, provide the capability to carry a relatively large number of passengers or a relatively large volume of cargo. In some vehicles, available cargo volume may be increased by removing one or more seats. In other vehicles, available cargo volume may be increased by re-positioning one or more of the seats.

U.S. Pat. No. 5,482,349 to Richter et al. is an example of a seat that may be re-positioned. According to Richter et al., a latch mechanism is connected between a seat back member and a seat cushion member. The latch mechanism selectively controls pivotal movement of the seat back member relative to the seat cushion member. A mounting mechanism associated with each of front and rear seat legs is co-operable with a respective attachment member affixed to the vehicle floor. This permits movement of the seat cushion member from a first in-use position within the vehicle to a second forwardly translated stowed position within the vehicle.

U.S. Pat. No. 5,570,931 to Kargilis et al. is another example of a seat that may be re-positioned. According to Kargilis et al., a longitudinally adjustable vehicle seat is supported on a bi-level seat frame for movement from an occupant in-use position to a compact fold-flat position. The vehicle seat includes a seat cushion and a seat back. The bi-level seat frame includes a front lower portion slidably supported on front track assemblies. The bi-level seat frame also includes a rear elevated portion slidably supported on rear track assemblies. A pair of forward upright links have lower ends pivoted on the seat frame front portion for rotation about a first transverse axis. The pair of forward upright links also have upper ends pivoted to associated front underlying portions of the seat cushion for rotation about a second transverse axis. A pair of upstanding laterally spaced arms have lower ends fixed to an aft end of the seat cushion and upper ends pivoted to an intermediate portion of the seat back for rotation about a third transverse axis. The seat back has its lower portion pivoted to a pair of pivot mounts on the seat frame elevated portion for rotation about a fourth transverse pivot axis. Upon the seat back being unlatched and pivoted forwardly about the pivot mounts, the seat cushion undergoes conjoint parallelogram movement about the four pivot axes to a stowed position adjacent the floor of the vehicle.

U.S. Pat. No. 6,817,670 to Macey is yet another example of a seat that may be re-positioned. According to Macey, a forward edge of a seat base is mounted to a pivoting front leg. A rearward edge of the seat base is supported by a roller or pin riding in a longitudinal track on a load floor of the vehicle. The seat back is pivotally mounted to a fixed point on the load floor of the vehicle. The seat back is also connected to the seat base by an articulating link. The articulating link is pivotally mounted to the seat back and to the seat base at the roller so that the lower end of the link follows the longitudinal track on the load floor of the vehicle.

SUMMARY

A seat system for an automotive vehicle includes a seat back and a seat bottom. The seat back is movably attached with the seat bottom. A tumble linkage has an end pivotally attached with the seat bottom and another end being configured to be pivotally attached with the vehicle. The tumble linkage moves toward a floor of the vehicle as the seat back and seat bottom tumble toward a front of the vehicle.

The seat system may also include a kneel linkage. The seat back may be movably attached with the seat bottom via the kneel linkage. The kneel linkage may be configured to move the seat bottom toward the front of the vehicle as the seat back moves toward the seat bottom.

An automotive vehicle seat includes a seat bottom and a link member. The link member is pivotally attached with the seat bottom and pivotally attachable with a vehicle floor. The link member is configured to rotate toward the vehicle floor and the seat bottom is configured to tumble toward a front of the vehicle as the link member rotates toward the vehicle floor.

A method of folding and tumbling a seat system for an automotive vehicle includes moving a seat back toward a seat bottom and moving the seat bottom toward a front of the vehicle as the seat back moves toward the seat bottom. The method also includes tumbling the seat back and seat bottom toward the front of the vehicle such that a tumble linkage moves toward the floor of the vehicle.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1A is a side view of an automotive vehicle seat in an upright position according to certain embodiments of the invention;

FIG. 1B is a side view of the automotive vehicle seat of FIG. 1A in a folded position;

FIG. 1C is a side view of the automotive vehicle seat of FIG. 1A in a tumbled position;

DETAILED DESCRIPTION

Figure 2A:
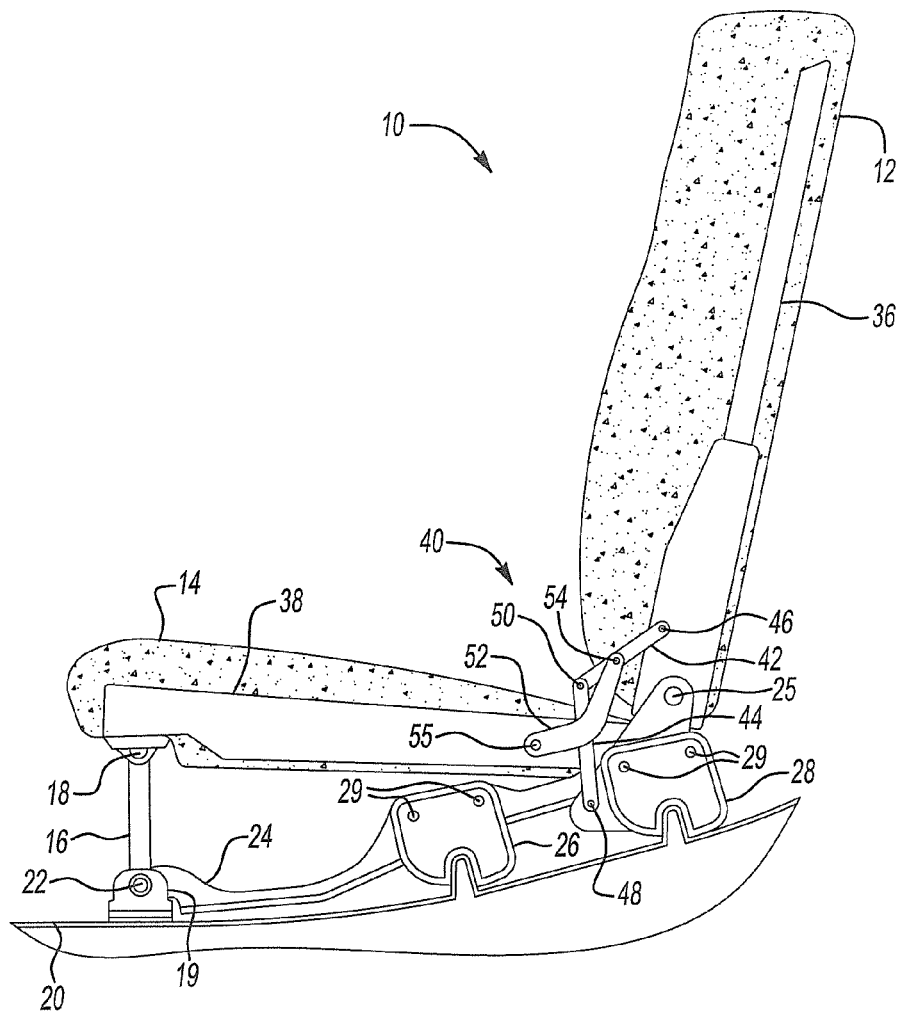
FIG. 2A is a side view, partially cut-away, of the vehicle seat of FIG. 1A.

Exemplary automotive vehicle seat system 10 of FIG. 1A includes a seat back 12 and a seat bottom 14. The seat back 12 is in an upright position relative to the seat bottom 14. A link member 16 is moveably attached to the front of the seat bottom 14 at, for example, a pivot 18. The link member 16 is also moveably attached to a vehicle support member. For example, the link member 16 may be pivotally attached to a member 19, that is mounted on a vehicle floor 20, via a pivot 22. As another example, the link member 16 may be pivotally attached to a vehicle side wall.

In the example of FIG. 1A, the seat bottom 14 and link member 16 are freely moveable about the pivots 18, 22. In other examples, a latch, or other suitable mechanism, may be used to lock the seat bottom 14 and link member 16 in place relative to each other when the seat back 12 is in the upright position relative to the seat bottom 14. In such examples, the latch would be released before folding and/or tumbling the seat system 10.

Bracketry 24 is attached with the seat back 12 at a pivot 25 (FIG. 2A). The link member 16 and bracketry 24 at least partially carry the load of the seat back 12 and the seat bottom 14. The link member 16 and bracketry 24 transfer this load to the vehicle floor 20. The bracketry 24 is pivotally attached with the member 19 via the pivot 22. In other examples, the bracketry 24 may be attached with a sidewall of the vehicle or other suitable support member. The bracketry 24 is freely movable about the pivot 22. The bracketry 24 is also latchably attached with the vehicle floor 20 via latches 26, 28. The latches 26, 28 are mechanically fastened, e.g., bolted, with the bracketry 24 at attach points 29. The latches 26, 28 may be any suitable latches for latchably attaching the seat system 10 to the vehicle. As an example, each latch 26, 28 may include a clamp that locks onto a portion of the vehicle floor 20, or a member connected to the vehicle, that is configured to receive the clamp. When latched, the seat bottom 14, link member 16 and bracketry 24 are prevented from freely moving about the pivots 18, 22.

Referring to FIG. 1B, the seat back 12 is shown in a folded position relative to the seat bottom 14. A release handle 30 located on the seat bottom 14 permits a user to release a suitable lock mechanism (not shown) connected between the seat back 12 and the seat bottom 14. In other examples, any suitable user input device, e.g., a release button, may be used to release the lock mechanism. The lock mechanism locks the seat back 12 in the upright position relative to the seat bottom 14. Once released, the seat back 12 may be rotated toward the seat bottom 14.

A linkage, described in detail below, moves the seat bottom 14 toward the front of the vehicle as the seat back 12 is rotated toward the seat bottom 14. As the seat bottom 14 moves toward the front of the vehicle, the link member 16 rotates toward the vehicle floor 20. This movement allows a lower portion 32 of the seat back 12 to at least partially nest within a space previously occupied by the seat bottom 14 when the seat back 12 was in the upright position relative to the seat bottom 14. As a result, the system 10 is able to lower its overall height when the seat back 12 is in the folded position relative to the seat bottom 14. This lower overall height increases cargo space within the vehicle.

Referring to FIG. 1C, the seat back 12 and the seat bottom 14 are shown in a tumbled position. As the seat back 12 is rotated toward the seat bottom 14, a tensioned cable (not shown) releases the latches 26, 28 from the vehicle floor 20. In other examples, a handle or any other suitable user input device may be used to release the latches 26, 28 from the vehicle floor 20. Once released, the seat back 12, seat bottom 14 and bracketry 24 may be tumbled toward the front of the vehicle. As a result, the seat system 10 is able to alter its position relative to the vehicle floor 20. This altered position increases cargo space within the vehicle. In other examples, the seat back 12, seat bottom 14 and bracketry 24 may be configured to tumble to a position in which the seat back 12, seat bottom 14 and bracketry 24 are substantiality upright. Other configurations are also possible.

Referring to FIG. 2A, the seat back 12 includes a back member 36, such as a back frame member, and the seat bottom 14 includes a bottom member 38, such as a bottom frame member. The seat back 12 is in the upright position relative to the seat bottom 14. A linkage 40 is configured to move the seat bottom 14 toward the front of the vehicle as the seat back 12 is rotated toward the seat bottom 14. The linkage 40 includes first and second members 42, 44 respectively. The first member 42 is attached to the back member 36 at a pivot 46. The second member 44 is attached to the bracketry 24 at a pivot 48. The members 42, 44 are attached to each other at a pivot 50. The members 42, 44 form an angle between them when the seat back 12 is in the upright position relative to the seat bottom 14. The linkage 40 also includes an elbow member 52 that is attached to the first member 42 at a pivot 54. The elbow member 52 is also attached to the bottom member 38 at a pivot 55. In other examples, the linkage 40 may include any number of links configured to move the seat bottom 14 toward the front of the vehicle as the seat back 12 is rotated toward the seat bottom 14. As an example, the linkage 40 may include a single link. As another example, the linkage 40 may include seven links.

As the seat back 12 is rotated toward the seat bottom 14, the members 42, 44 fold thereby decreasing the angle between them. This folding moves the pivot 54 toward the front of the vehicle. The movement of the pivot 54 is translated into movement of the bottom member 38, and thus the seat bottom 14, toward the front of the vehicle via the elbow member 52 and link member 16.

Figure 2B:
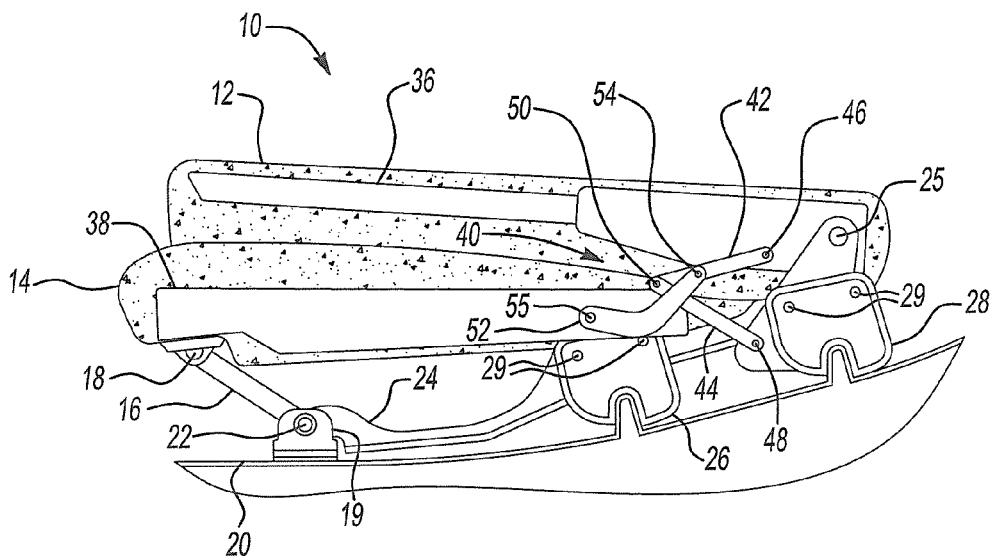
FIG. 2B is a side view, partially cut-away, of the vehicle seat of FIG. 1B.

Referring to FIG. 2B, the seat back 12 is in the folded position relative to the seat bottom 14. The members 42, 44 are collapsed in toward each other. A rear of the bottom member 38 is moved away from a rear of the bracketry 24 by action of the linkage 40 and the link member 16.

Figure 3A:
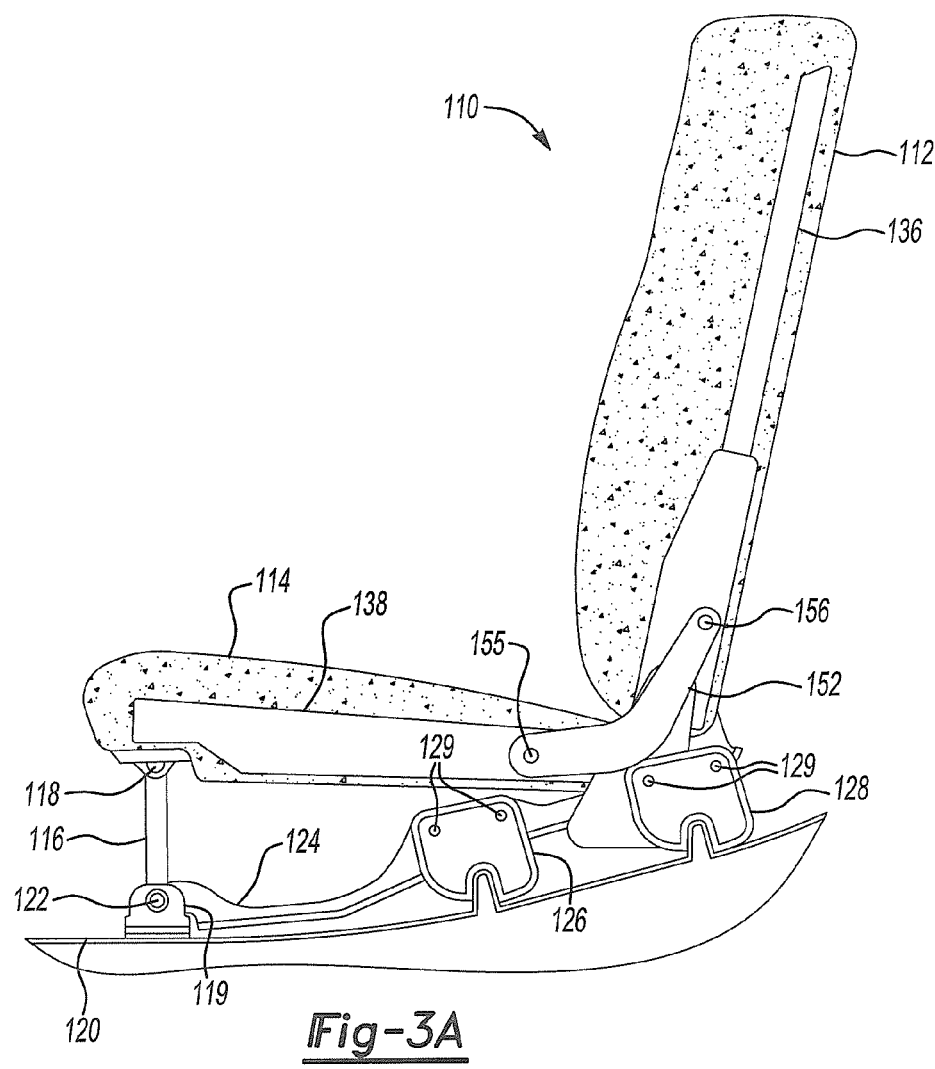
FIG. 3A is a side view, partially cut-away, of another automotive vehicle seat in an upright position according to certain embodiments of the invention.

Exemplary automotive vehicle seat system 110 of FIG. 3A includes a seat back 112 and a seat bottom 114. Numbered elements of FIG. 3A differing by 100 relative to numbered elements of FIGS. 1A-2B have similar, although not necessarily identical, descriptions. The seat back 112 is in an upright position relative to the seat bottom 114. The seat back 112 includes a back member 136, such as a back frame member, and the seat bottom 114 includes a bottom member 138, such as a bottom frame member. A link member 116 is movably attached to the front of the seat bottom 114 at a pivot 118. The link member 116 is also movably attached to a member 119, that is mounted on a vehicle floor 120, via a pivot a pivot 122. The seat bottom 114 and link member 116 are freely movable about the pivots 118, 122. In other examples, the link member 116 may include a plurality of members.

Figure 3B:
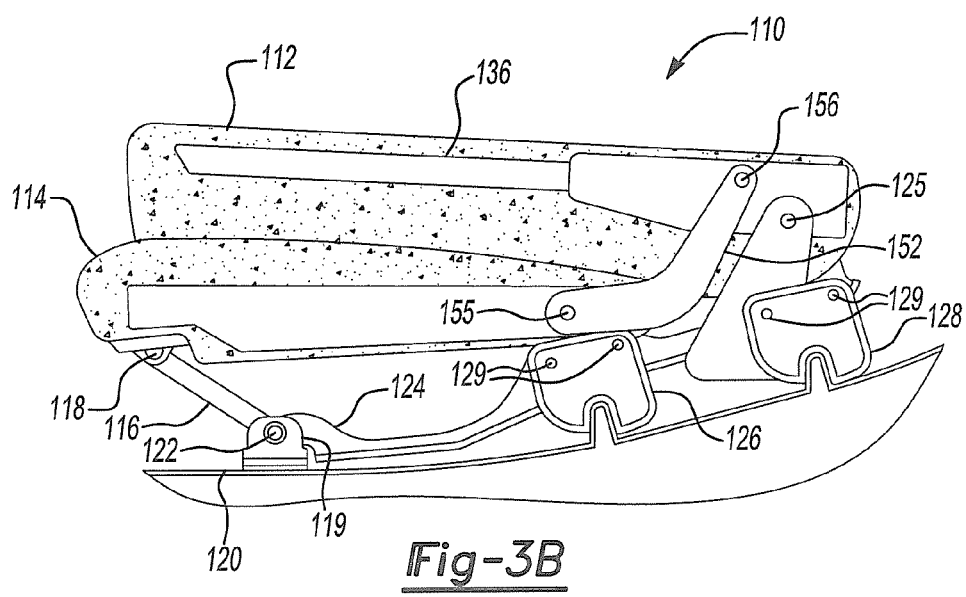
FIG. 3B is a side view, partially cut-away, of the automotive vehicle seat of FIG. 3A in a folded position.

Bracketry 124 is attached with the seat back 112 at a pivot 125 (FIG. 3B). The link member 116 and bracketry 124 at least partially carry the load of the seat back 112 and the seat bottom 114. The link member 116 and bracketry 124 transfer this load to the vehicle floor 120. The bracketry 124 is pivotally attached with the member 119 via the pivot 122. The bracketry 124 is freely movable about the pivot 122. The bracketry 24 is also latchably attached with the vehicle floor 120 via latches 126, 128. The latches are mechanically fastened, e.g., bolted, with the bracketry 124 at attach points 129.

An elbow member 152 is configured to move the seat bottom 114 toward the front of the vehicle as the seat back 112 is rotated toward the seat bottom 114. The elbow member 152 is attached to the back member 136 at a pivot 156. The elbow member 152 is also attached to the bottom member 138 at a pivot 155. As the seat back 112 is rotated toward the seat bottom 114, the pivot 156 moves toward the front of the vehicle. The movement of the pivot 156 is translated into movement of the bottom member 138, and thus the seat bottom 114, toward the front of the vehicle 125 via the elbow member 152 and link member 116.

Referring to FIG. 3B, the seat back 112 is in the folded position relative to the seat bottom 114. A rear of the bottom member 138 is moved away from a rear of the bracketry 124 by action of the elbow member 152 and the link member 116.

Figure 4:
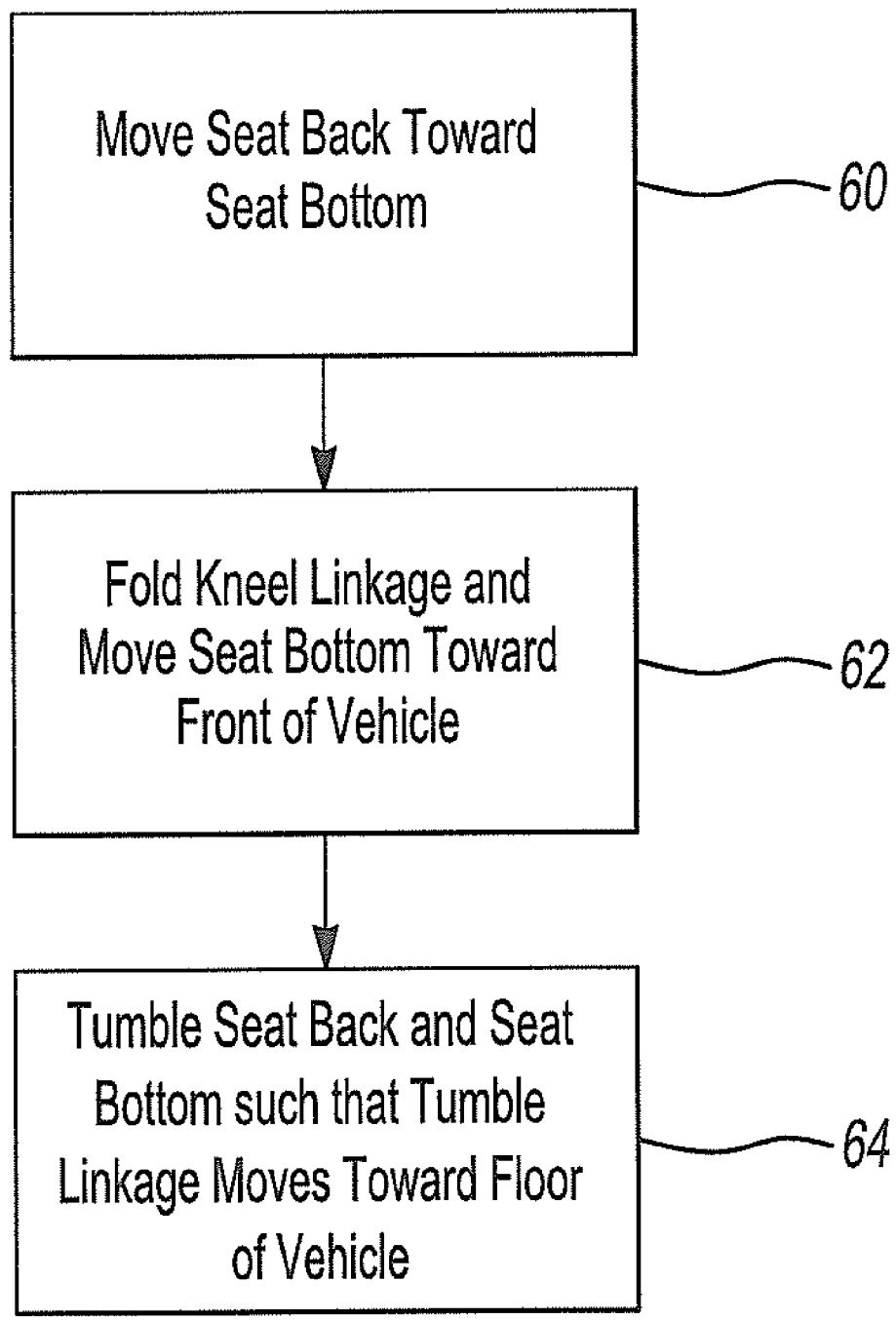
FIG. 4 is a flow chart of a method for folding and tumbling an automotive vehicle seat according to certain embodiments of the invention.

An exemplary method of folding and tumbling an automotive vehicle seat is illustrated in the flow chart of FIG. 4. At block 60, a seat back is moved toward a seat bottom. As an example, the seat back 12 of FIG. 2A rotates toward the seat bottom 14 of FIG. 2A. At block 62, a linkage is folded and the seat bottom is moved toward a front of the vehicle as the seat back moves toward the seat bottom. As an example, the linkage 40 of FIGS. 2A-2B folds together and the seat bottom 14 of FIGS. 2A-2B moves toward a front of the vehicle as the seat back 12 of FIGS. 2A-2B rotates toward the seat bottom 14 of FIGS. 2A-2B. At block 64, the seat back and seat bottom are tumbled toward the front of the vehicle such that a tumble linkage moves toward the floor of the vehicle. As an example, the seat back 12 and seat bottom 14 of FIG. 1B tumble toward the front of the vehicle such that the link member 16 of FIG. 1B rotates toward the floor 20 of FIG. 1B of the vehicle.

The exemplary seat systems 10, 110 of FIGS. 1A-3B may be re-positioned within a vehicle to increase cargo space. For example, a user may fold the seat system 10 to increase available cargo space previously occupied by the seat back 12 when the seat back 12 and seat bottom 14 were in the upright position. A user may also tumble the seat system 10 to increase available floor cargo space previously occupied by the seat back 12 and seat bottom 14 when the seat back 12 and seat bottom 14 were in the upright or folded positions. The exemplary seat systems 10, 110 of FIGS. 1A-3B may also be re-positioned within a vehicle for ease of access to vehicle spaces behind the seat systems 10, 110.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat system for an automotive vehicle having a floor, the system comprising:
   a seat back;
   a seat bottom having a front portion and a rear portion, the seat back being movably attached with the seat bottom proximate the rear portion of the seat bottom;
   a tumble linkage having an end pivotally attached with the seat bottom and having another end being configured to be pivotally attached with the vehicle, the seat back and seat bottom being configured to tumble toward a front of the vehicle as the tumble linkage moves toward the vehicle floor;
   a kneel linkage, the seat back being movably attached with the seat bottom via the kneel linkage and the kneel linkage being configured to move the seat bottom toward the front of the vehicle as the seat back moves toward the seat bottom; and
   bracketry that at least partially supports the seat back and seat bottom, the kneel linkage including (i) first and second members pivotally attached with each other and respectively pivotally attached with the seat back and bracketry and (ii) a third member pivotally attached with the first member and attached with the seat bottom.

2. The system of claim 1 wherein the tumble linkage includes a member pivotally attached with the seat bottom and being configured to be pivotally attached with the vehicle.

3. The system of claim 1 wherein the first and second members are configured to fold as the seat back moves toward the seat bottom.

4. The system of claim 1 further comprising bracketry attached with the seat back and configured to be pivotally attached with the vehicle, wherein the bracketry is configured to tumble toward the front of the vehicle as the tumble linkage moves toward the vehicle floor.

5. An automotive vehicle seat system comprising:
   a seat bottom;
   a link member pivotally attached with the seat bottom and pivotally attachable with a vehicle floor, the link member being configured to rotate toward the vehicle floor and the seat bottom being configured to tumble toward a front of the vehicle as the link member rotates toward the vehicle floor; and
   bracketry attached with the seat back and configured to be pivotally attached with the vehicle, the bracketry being configured to tumble toward the front of the vehicle as the link member rotates toward the vehicle floor.

6. The system of claim 5 further comprising a seat back associated with the seat bottom, wherein the seat back is movable relative to the seat bottom between an upright position and a folded position.

7. The system of claim 6 further comprising a kneel linkage associated with the seat back and seat bottom, wherein the seat back is movable relative to the seat bottom between the upright position and the folded position via the kneel linkage, and wherein the kneel linkage is configured to move the seat bottom toward the front of the vehicle as the seat back moves from the upright position to the folded position.

8. The system of claim 7 further comprising bracketry that at least partially supports the seat back and the seat bottom, wherein the kneel linkage includes first and second members pivotally attached with each other and respectively pivotally attached with the seat back and bracketry, and wherein the kneel linkage further includes a third member pivotally attached with the first member and attached with the seat bottom.

9. The system of claim 8 wherein one of the first and second members is configured to fold toward the other of the first and second members as the seat back moves toward the seat bottom.

10. The system of claim 7 wherein the kneel linkage includes a member pivotally attached with the seat back and attached with the seat bottom.

11. A seat system for an automotive vehicle having a floor, the system comprising:
    a seat back;
    a seat bottom having a front portion and a rear portion, the seat back being movably attached with the seat bottom proximate the rear portion of the seat bottom;
    a tumble linkage having an end pivotally attached with the seat bottom and having another end being configured to be pivotally attached with the vehicle, the seat back and seat bottom being configured to tumble toward a front of the vehicle as the tumble linkage moves toward the vehicle floor; and
    bracketry attached with the seat back and configured to be pivotally attached with the vehicle, wherein the bracketry is configured to tumble toward the front of the vehicle as the tumble linkage moves toward the vehicle floor.

12. The system of claim 11 wherein the tumble linkage includes a member pivotally attached with the seat bottom and being configured to be pivotally attached with the vehicle.

* * * * *